May 24, 1949. W. T. HASWELL, JR 2,470,774
INDICATING DEVICE
Filed April 12, 1945
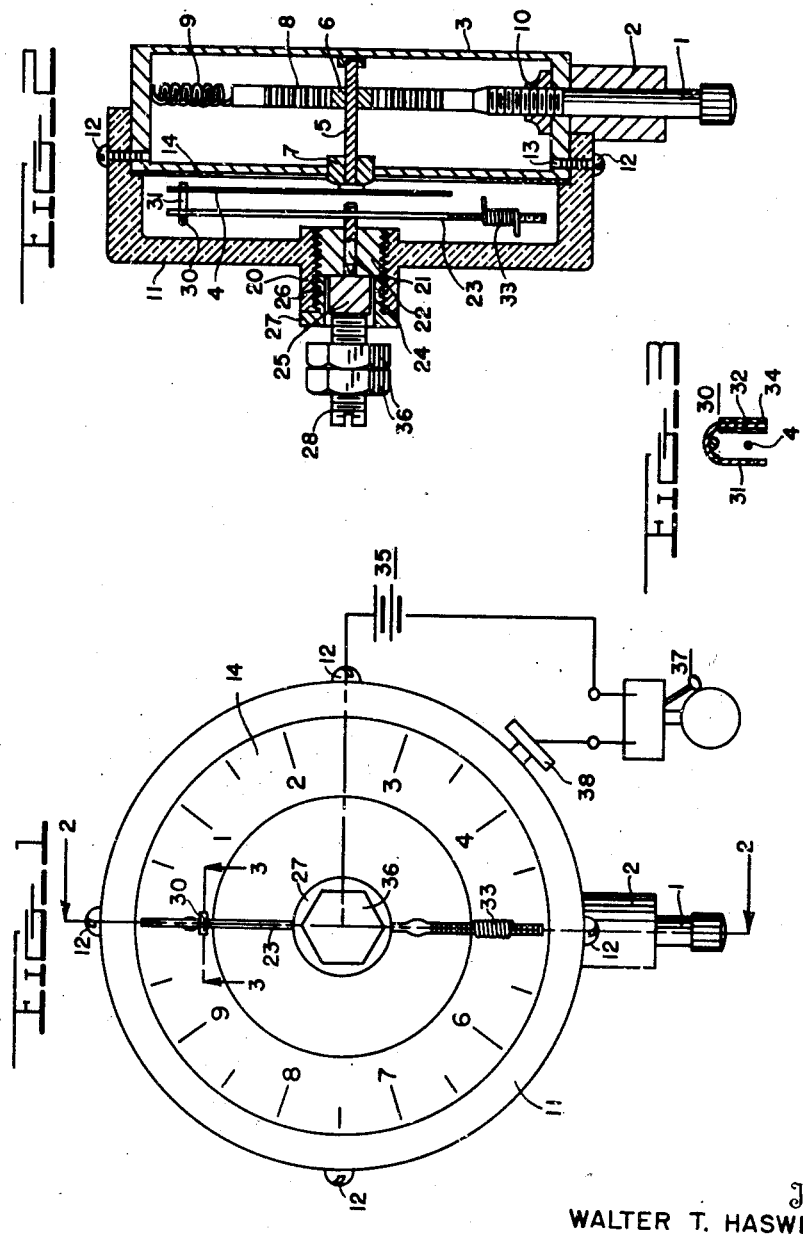
Inventor
WALTER T. HASWELL
By Ralph L Chappell
Attorney Patented May 24, 1949

2,470,774

UNITED STATES PATENT OFFICE 2,470,774

INDICATING DEVICE

Walter T. Haswell, Jr., United States Navy

Application April 12, 1945, Serial No. 588,050

2 Claims. (Cl. 200—56)

(Granted under the act of March 3, 1883, as amended April 30, 1928; 370 O. G. 757)

This invention relates to indicating devices and more particularly to a follower for electrically indicating the direction of rotation of a dial gage needle.

In some applications in which dial gages are employed, it may be desirable to have some means for indicating the direction of rotation and particularly for instantly indicating a reversal of direction of rotation of the dial gage needle. One such situation is that wherein the transformation point of a metal being subjected to a given change of temperature is to be ascertained. Where the temperature of the metal is being changed at a rapid rate, the transformation may occur so suddenly and over so short a period of time, that for practical purposes no visible indication may be had by observing the momentary reversal of direction of rotation of the needle of a gage so associated with the metal specimen as to indicate changes occurring in the length of the metal specimen as the temperature of the specimen changes.

An object of the present invention is to provide an effective and efficient follower for electrically indicating the direction of rotation of a dial gage needle.

In accordance with one embodiment of this invention, a dial gage indicating device employing a rotatable needle may be provided with a follower arm for electrically indicating the direction of rotation of the needle, comprising a counter-balanced arm, rotatably supported in spaced relation to the needle on an axis of rotation coaxial with the axis of rotation of the needle. Rotation of the needle in one direction causes it to engage an insulated portion on a U-shaped member mounted on the end of the follower arm, the needle extending between the sides thereof. Rotation of the needle in the opposite direction causes it to engage a conducting portion thereof and thereby to complete a circuit indicating the direction of rotation of the needle.

Other objects and advantages of the present invention will be apparent from the following detailed description taken in conjunction with the drawings, wherein:

Fig. 1 is a front, elevational view of a dial gage indicating device having a follower associated therewith in accordance with this invention;

Fig. 2 is vertical, sectional view taken along the line 2—2 of Fig. 1; partially in elevation; and Fig. 3 is an enlarged, detail, vertical, sectional view, taken along the line 3—3 of Fig. 1.

Referring now to the drawings, and particularly to Fig. 1 thereof, wherein for the purpose of illustrating the operation of the present invention, a simplified dial gage meter is illustrated comprising a longitudinally reciprocable plunger 1, which is slidably journalled in a guide block 2, mounted on the lower side of a cylindrical metal housing 3, wherein is located the mechanism by which an indicating needle 4 is rotated. The needle 4 is fixed to the left end of a short shaft 5, at the right end of which is mounted a small pinion gear 6 whereby the shaft 5 is rotated, the shaft being rotatably supported in a bearing 7 mounted in the center of the forward portion of the housing 3. The gear 6 engages a rack 8 which extends upwardly from the upper end of the plunger 1 and may be integrally formed therewith, as shown. Longitudinal movement of the plunger thus causes the needle to rotate and thereby to indicate the amount of movement of the plunger. A return spring 9 is suitably mounted inside the housing 3 and urges the plunger 1 downward, while a nut 10 threaded to the upper portion of the plunger 1 and engageable with the lower, inner side of the housing 3 retains the plunger in the housing and provides a zero adjustment for the needle.

As shown in Fig. 2, a cylindrical, or flat, cup-shaped, follower housing 11 of somewhat greater internal diameter than the housing 3 is mounted on the left portion of the housing 3.

In order to support the housing 11 on the housing 3, four screws 12 are disposed at equally spaced intervals about the periphery of the housing 11 and extend transversely therethrough to engage the sides of four correspondingly located internally threaded apertures 13 which are formed in the left portion of the periphery of the housing 3, and extend transversely therethrough. A calibrated annular dial plate 14 is mounted on the left side of the housing 3.

The follower housing 11 is made of a transparent insulating material, such as Lucite, and serves both as a protective cover for the dial gage and as a support for the follower mechanism. A hub 20 is integrally formed with the central portion of the housing 11 and is internally threaded to receive an externally threaded, metal, sleeve bearing 21, which is mounted therein. A pivot shaft 22, which serves as a support for a follower arm 23, is disposed in a bore 24 formed in the central portion of the sleeve bearing 21, the follower arm 23 being mounted at right angles to the right end of the shaft and at a point substantially mid-way between the ends of the follower rod.

The shaft 22 is retained in the sleeve bearing by a cylindrical block 25 of magnetic material which is mounted at the left end of the bearing 21, the shaft 22 being made of a magnetically susceptible material such as martensitic stainless steel, which also possess desirable corrosion resistant properties. The magnetic block 25 may be soldered or otherwise suitably affixed to the sleeve bearing 21. In order to reduce friction at the point of contact between the shaft 22 and the block 25, the left end of the shaft, as viewed in Fig. 2, may be pointed. An externally threaded nut 26 having an integrally formed knurled flange 27 at its left end is threaded into the hub 20 and bears against the left end of the sleeve bearing 21. After the position of the sleeve bearing 21 has been adjusted to correctly position the follower rod 23, which is conveniently accomplished by rotating a shaft 28 which extends from the left side of the block 25 and is suitably mounted thereon, the nut 26 is rotated to lock the bearing securely in position.

In order to electrically indicate the direction of movement of the needle 4, a small U-shaped rod 30 of electrically conductive material is soldered adjacent one end of the follower rod 23 and so positioned that its two side members 31 and 32, respectively, extend on either side of the needle 4 so that the needle in moving in a clockwise direction will engage the side member 31, while in moving in a counter-clock-wise direction it will engage the side member 32. A counterbalance 33, such as the helical spring illustrated, is mounted on the opposite end of the follower rod 23 from that on which the U-shaped member 30 is mounted to equalize the thrust on the bearing 21.

In the operation of this device, a circuit to an indicator or registering device is completed by the needle 4 engaging one or the other of the side members 31 or 32 as will be hereinafter explained. One side member, such as the member 32 is insulated, so that upon the needle contacting that side member no circuit will be completed. Insulation is accomplished by slipping a small sleeve 34 of insulating material having a suitable cross sectional size over the side member to be insulated. The tube 34 as shown in Fig. 3 is positioned over the side member 32.

One side of a battery 35 may be connected to the shaft 28, which is threaded to receive two nuts 36 whereby the connecting lead may be securely attached to the shaft. The other side of the battery may be connected through a bell 37 to a terminal 38 mounted on the housing 3.

The housing 3 is electrically connected to the needle 4 through the needle rotating mechanism which is made of metal and the needle itself is made of metal as hereinbefore stated. When the needle 4 is rotating in one direction, it will be apparent that it will engage one side of the U-shaped member 30 and while traveling in the reverse direction it will, obviously, engage the other side of the U-shaped member, in either case causing the follower rod 23 to rotate with the needle. By positioning the insulating sleeve 34 on one or the other of the side members 31 or 32, the apparatus of this invention may be made to indicate the direction of rotation of the needle 4, since when the needle engages the insulated side 32 no circuit will be completed, but when the needle engages the side 31 a circuit will be completed to ring the bell 37, or other suitable electrically operable indicating device. Where the device is employed to indicate a momentary reversal in the direction of rotation of the needle, it is of course desirable that the spacing between the side members 31 and 32 be made as small as possible in order to obtain a high degree of accuracy.

While this invention has been shown in conjunction with a simplified, plunger actuated, dial gage device, it will be understood that many changes and modifications may be made in this invention and that it may be employed with many other devices incorporating a rotating element the direction of rotation of which is to be indicated without departing from the spirit or scope of the present invention.

The invention described herein may be manufactured and used by or for the Government of the United States of America for governmental purposes without the payment of any royalties thereon or therefor.

What is claimed is:

1. In an indicating instrument having a rotary indicator needle rotated in a vertical plane and a follower arm movable by and with the needle in both of two opposite movements of the needle for closing and opening an electric circuit through the needle and follower arm in response to one or the other opposite movements of the needle respectively, a pivotal bearing for the follower arm comprising a pivot shaft, a sleeve bearing member having a horizontal bore in which the shaft fits loosely, a thrust-bearing block of magnetized material closing one end of the bore and against which one end of the pivot shaft is held in direct contact by magnetic attraction in a direction away from the needle, said one end having a point bearing directly against the magnetized pivot block.

2. In an indicating instrument having a rotary indicator needle rotated in a vertical plane and a follower arm movable by and with the needle in both of two opposite movements of the needle for closing and opening an electric circuit through the needle and follower arm in response to one or the other opposite movements of the needle respectively, a pivotal bearing for the follower arm comprising a pivot shaft, a sleeve bearing member having a horizontal bore in which the shaft fits loosely, a thrust-bearing block of magnetized material closing one end of the bore and against which one end of the pivot shaft is held in direct contact by magnetic attraction in a direction away from the needle, said one end having a point bearing directly against the magnetized pivot block, a casing and transparent cover-plate housing the needle, said sleeve bearing member being threaded into a portion of the cover-plate, the thrust-bearing block being fixedly secured to the sleeve bearing member and provided with a turning shaft for rotating the block and sleeve bearing for adjustment of the bearing as a whole to and away from the needle, said follower arm being connected with the pivot shaft through a follower rod at a point mid way between the ends of the rod.

WALTER T. HASWELL, Jr.

REFERENCES CITED

The following references are of record in the file of this patent:

UNITED STATES PATENTS

| Number | Name | Date |
|---|---|---|
| 341,822 | Walcher et al. | May 11, 1886 |
| 611,809 | Evershed | Oct. 4, 1898 |
| 642,424 | Brown | Jan. 30, 1900 |
| 922,456 | Casey | May 25, 1909 |
| 1,472,198 | Taylor | Oct. 30, 1923 |
| 2,164,113 | Kolb | June 27, 1939 |
| 2,304,042 | Schellentrager | Dec. 1, 1942 |
| 2,340,781 | Wagner | Feb. 1, 1944 |

FOREIGN PATENTS

| Number | Country | Date |
|---|---|---|
| 301,520 | Great Britain | Dec. 3, 1928 |
| 332,237 | Great Britain | July 10, 1930 |
| 494,453 | Great Britain | Oct. 26, 1938 |